United States Patent [19]

Takada

[11] Patent Number: 5,010,289

[45] Date of Patent: Apr. 23, 1991

[54] ANTI-FROST SYSTEM FOR A WINDSHIELD OF A MOTOR VEHICLE

[75] Inventor: Hirohisa Takada, Fukaya, Japan

[73] Assignee: Fuji Jukogyo Kabushiki Kaisha, Tokyo, Japan

[21] Appl. No.: 467,614

[22] Filed: Jan. 19, 1990

[30] Foreign Application Priority Data

Feb. 15, 1989 [JP] Japan .................. 1-37273

[51] Int. Cl.⁵ .................. B60L 1/02; B60S 1/54
[52] U.S. Cl. .................. 322/8; 15/250 C; 15/250.05; 219/203
[58] Field of Search .................. 219/203; 318/443; 15/250.01, 250.07, 250 C, 250.12, 250.05

[56] References Cited

U.S. PATENT DOCUMENTS

| | | | |
|---|---|---|---|
| 4,084,126 | 4/1978 | Clements | 322/8 |
| 4,317,073 | 2/1982 | Blaszkowski | 15/250 C |
| 4,693,172 | 9/1987 | Harvey | 219/203 X |
| 4,821,363 | 4/1989 | Delluc | 15/250.07 X |

FOREIGN PATENT DOCUMENTS

| | | | |
|---|---|---|---|
| 2035960 | 7/1970 | Fed. Rep. of Germany | 15/250 C |
| 58-174046 | 10/1983 | Japan | |
| 0114559 | 5/1989 | Japan | 15/250.05 |

*Primary Examiner*—R. J. Hickey
*Attorney, Agent, or Firm*—Martin A. Farber

[57] ABSTRACT

A system for preventing frost from accumulating on a window of a motor vehicle has a heating element provided on the window, a temperature switch, which is closed when the temperature of the window is lower than 0° C., and a humidity switch, which is closed when the humidity of air outside of the window becomes about 100%. When both the switches are closed, an electric circuit is closed to connect a battery with the heating element. At the same time, a wiper of the vehicle is operated for a short time to wipe out dew on the window.

5 Claims, 3 Drawing Sheets

ANTI-FROST SYSTEM FOR A WINDSHIELD OF A MOTOR VEHICLE

BACKGROUND OF THE INVENTION

The present invention relates to a system for preventing frost from accumulating on a vehicle window such as a windshield.

In order to prevent frost from accumulating on a windshield of a vehicle, Japanese Patent Laid Open 58-174046 discloses an electric circuit where an ambient temperature sensor, a switch responsive to the output of the sensor, and a time relay are provided between a battery and a wiper motor. When the ambient temperature decreases below a predetermined temperature while the vehicle is parked, the sensor, the switch and the time relay are actuated in turn so as to intermittently drive the wiper motor. Thus, the wipers wipe away the frost on the windshield.

U.S. Pat. No. 4,084,126 discloses a circuit for controlling electric energy for heating vehicle windows. In accordance with the system, a heating element of transparent metal film is embedded in a laminated windshield. When there is an ice accumulation on the windshield, a large amount of current flows from an alternator through the heating element when starting the vehicle so that the windshield is de-iced in two to four minutes. FIG. 3 shows a schematic electric circuit of such a system where the heating element of the windshield F is applied with a voltage from an alternator V through a switch S and a control unit U. However, in order to obtain the necessary current, a high voltage must be applied to the heating element. Therefore, means such as a DC/AC converter for converting direct current into alternating current is necessary, which increases the cost of the device. In addition, a large amount of power, more than 1500 watts is consumed for at a time de-icing. Accordingly, an alternator and battery having large capacities must be provided.

SUMMARY OF THE INVENTION

The object of the present invention is to provide a system which may prevent accumulations of frost on a windshield, at a low voltage and with small power.

According to the present invention, there is provided a system for preventing frost from accumulating on a windshield of a motor vehicle having a wiper system including an intermittent wiper unit for intermittently operating wipers of the vehicle, comprising a heating element provided on the windshield, a temperature switch producing a temperature signal when the temperature of the windshield is at about 0° C., a humidity switch for producing a humidity signal when the humidity of air outside of the windshield becomes about 100%, a gate responsive to the temperature signal and the humidity signal for producing a frost signal, switch means provided between the heating element and a battery of the vehicle and arranged to be closed in response to the frost signal for energizing the heating element, and operating means responsive to the frost signal for operating the intermittent wiper unit.

In an aspect of the invention, the switch means comprises a transistor responsive to the frost signal for closing a switch provided in an electric circuit for energizing the heating element.

The other objects and features of this invention will become understood from the following description with reference to the accompanying drawings.

DETAILED DESCRIPTION OF THE PREFERRED EMBODIMENT

Figure 1:
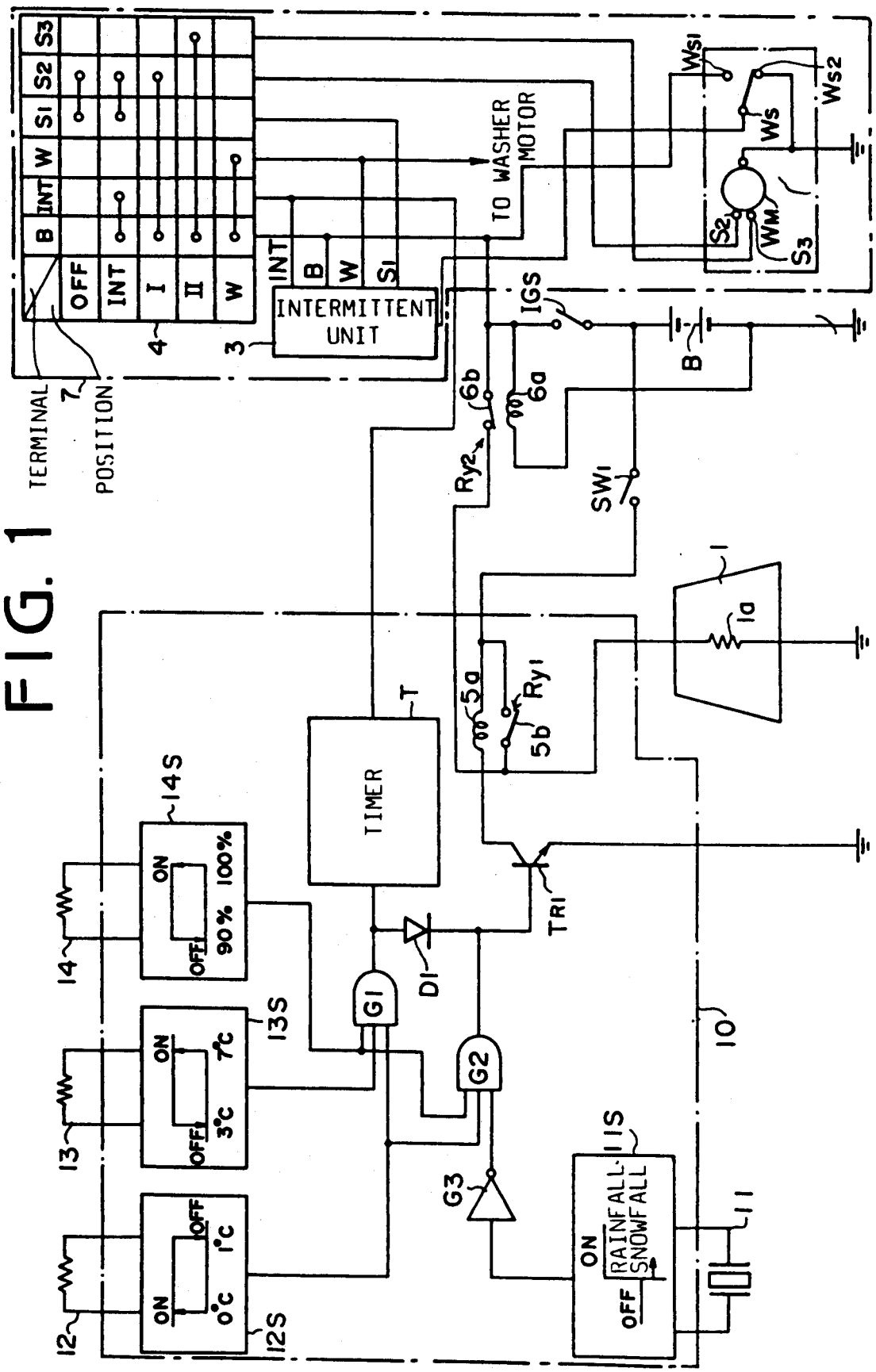
FIG. 1 shows an electric circuit for preventing accumulation of frost in accordance with the present invention.

Referring to FIG. 1, an electric circuit of the present invention for preventing frost from accumulating on a windshield of a vehicle has a battery B, a control unit 10, a heating element 1a of a transparent conductive film provided in a laminated windshield 1 of the vehicle, a manual anti-frost switch SW1, provided on a dashboard of the vehicle and a conventional wiper system 7.

A raindrop sensor 11, a windshield temperature sensor 12, an ambient temperature sensor 13 and a humidity sensor 14 are attached to the windshield 1 outside a wiping area thereof. An ambient temperature sensor provided for an automatic air-conditioner may be used as an ambient temperature sensor for the system. These sensors are electrically connected to a raindrop switch 11S, windshield temperature switch 13S, ambient temperature switch 13S and a humidity switch 14S. The windshield temperature switch 12S, is closed to produce a windshield temperature signal when the surface temperature of the windshield 1 falls to 0° C. and opened when the temperature rises to 1° C. The ambient temperature switch 13S closes at 7° C. and opens at 3° C. to produce an ambient temperature signal. The humidity switch 14S is connected to the windshield 1, and is provided to be closed to produce a humidity signal when the humidity of the ambient air near the windshield 1 becomes higher than 100%. The water switch 11S is closed by either rain water, snowmelt, or snow to produce a water signal.

The outputs of the switches 12S, 13S and 14S are connected to a three-input AND gate G1. A second AND gate G2 is provided to be supplied with the output signal of the switch 11S through an inverter G3 and the output signals of the switches 12S and 14S. The output of the AND gate G1 is connected to a base of a transistor TR1 through a diode D1 and the output of the AND gate G2 is also connected to the base. The emitter of the transistor TR1 is grounded, and the collector is connected to the battery B through a coil 5a of a relay Ry1 and the anti-frost switch SW1. The relay Ry1 has a normally open switch 5b which is connected to the battery B through the anti-frost switch SW1 and to the heating element 1a in series. The heating element 1a is further connected to the battery B through a normally closed switch 6b of a relay Ry2 and an ignition switch IGS. A coil 6a of the relay Ry2 is connected between the switch IGS and the ground in parallel to the ignition switch IGS and the battery B.

When the ignition switch IGS is closed at the starting an engine of the vehicle, the coil 6a of the relay Ry2 is energized. The switch 6b is opened accordingly, thereby disconnecting the heating element 1a from the battery B.

The output of the AND gate G1 is further fed to the wiper system 7 through a timer T. The wiper system 7 comprises a wiper/washer switch 4, wiper motor WM and a intermittent wiper unit 3. As shown by a diagram of the switch 4 in FIG. 1, the wiper/washer switch 4 is adapted to operate the wiper in three different modes, namely, intermittent (INT), speed I and speed II modes, and washer operating mode (W). The connection of terminals INT, W, S1, S2 and S3 of the switch 4 are shown by lateral lines in the diagram.

Figure 2:
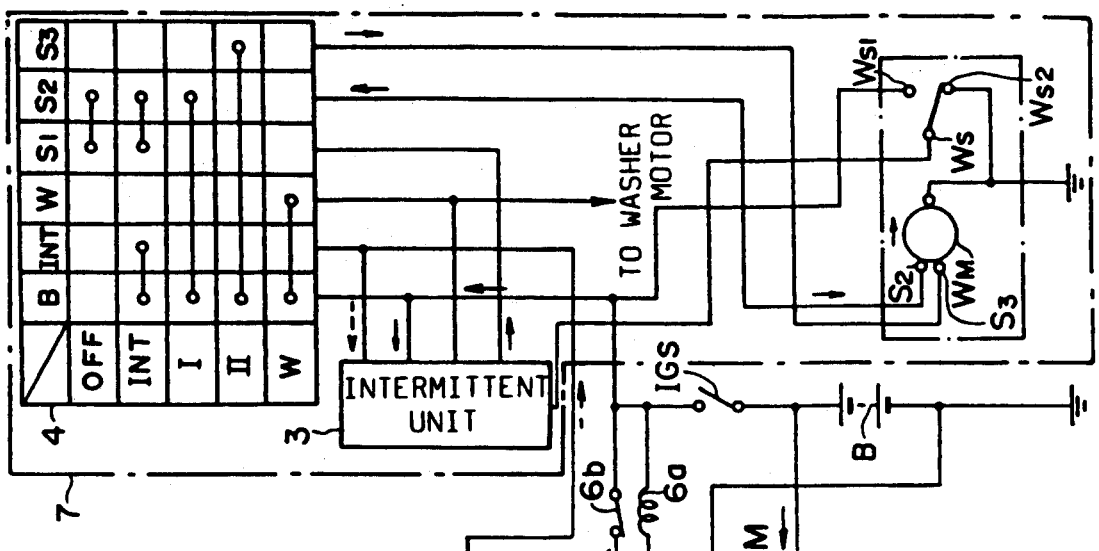
FIG. 2 shows the electric circuit of FIG. 1 in operation.
Figure 2:
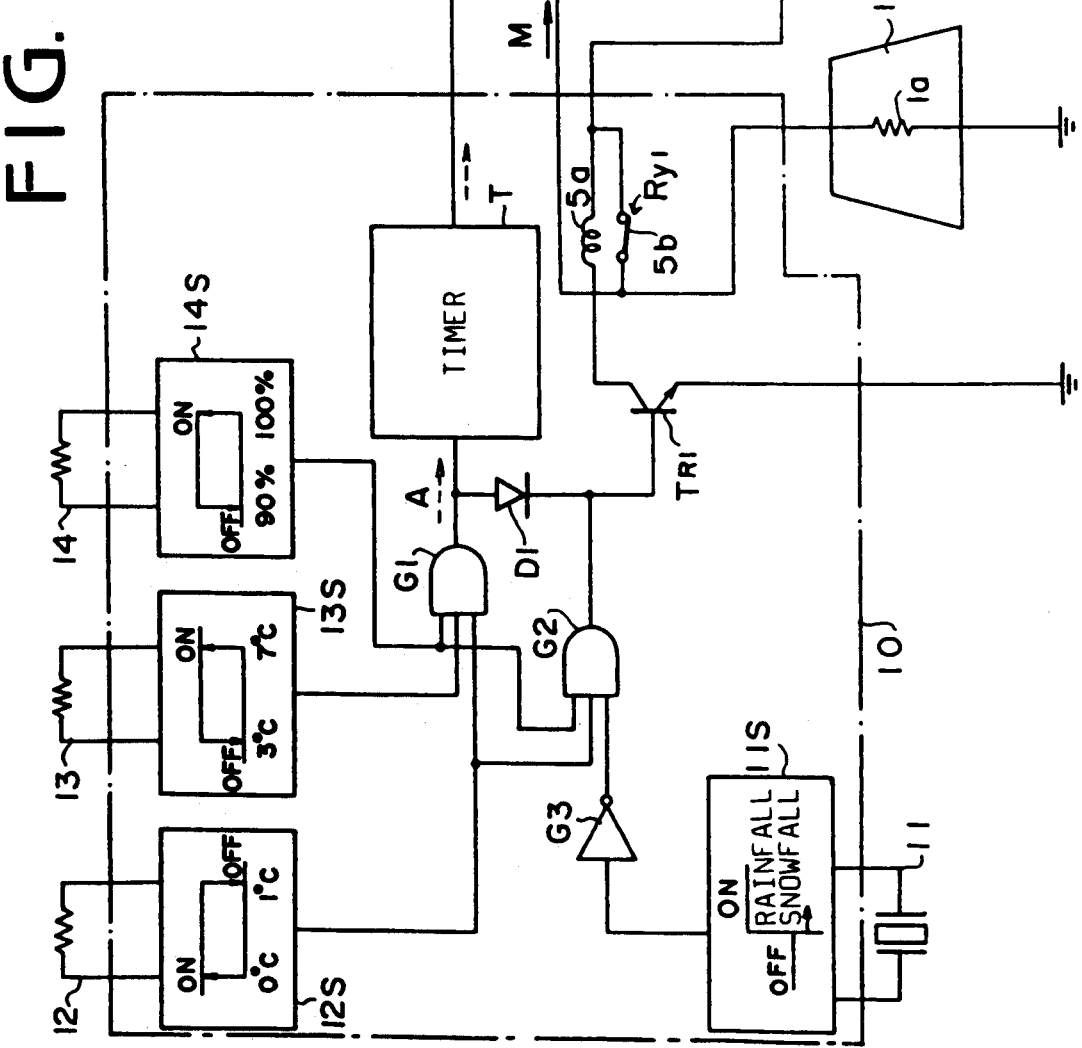
Figure 3:
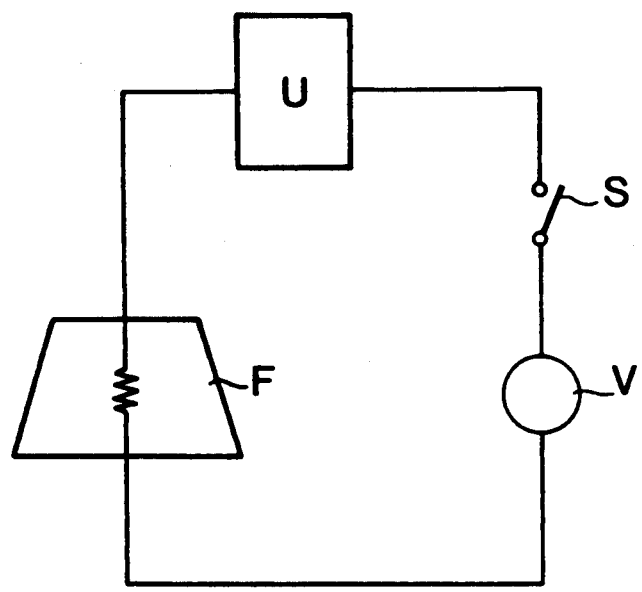
FIG. 3 shows an electric circuit of a conventional de-icer system.

The operation of the system will be described hereinafter with reference to FIG. 2. In order to prevent the frost from accumulating on the windshield 1 during parking of the vehicle, the anti-frost switch SW1 is closed.

When the ambient temperature is above 7° C. and the humidity rises to 100% and the temperature of the surface of the windshield 1 is below 0° C., the switches 12S, 13S and 14S are closed, so that the windshield temperature signal, the ambient temperature signal and the humidity signal are applied to the AND gate G1. As shown by dotted arrows A in FIG. 2, the AND gate G1 produces a signal which is applied to the wiper intermittent unit 3 of the wiper system 7 through the timer T so as to select the intermittent operation of the wiper for a predetermined period of time T'.

At the same time, the output of the AND gate G1 is fed to the base of the transistor TR1 to render the transistor TR1 conductive energizing the coil 5a, thereby closing the switch 5b. As shown by solid arrows M, a voltage for operating the wiper is supplied from the battery B to the motor WM through the switches SW1, 5b, 6b, the intermittent wiper unit 3 and the terminals S1 and S2 of the wiper/washer switch 4. The wiper is thus intermittently operated for a set time T' to wipe away the dew on the windshield 1.

On the other hand, the heating element 1a is connected with the battery B through the switch 5b, thereby heating the windshield 1. Thus, dew on the windshield is quickly evaporated by the heat of the heating element 1a. Since most of the dew in already wiped by the wiper, a very small power is required to evaporate the remaining dew.

When the windshield 1 is heated, and the temperature of the surface of the windshield rises to 1° C., the switch 12S is opened to cause the output of the AND gate G1 to go to zero. Thus, the heat current to the heating element 1a is cut-off. When the temperature of the windshield again becomes lower than 0° C., the switch 12S is again closed. The operation of the system is thus repeated so that the heat current intermittently flows through the heating element 1a. The windshield 1 is kept at 0° C. when the dew point temperature is higher than 0°, or kept at the dew point when the dew point is under 0°. Therefore, the frost is effectively prevented from forming on the windshield.

When it rains or snows, the raindrop switch 11S is closed, and hence a low level signal is applied to the AND gate G2 from the inverter G3. Therefore, even if the switches 12S and 13C produce high level outputs, the AND gate G2 produces a low level output, rendering the transistor TR1 inoperative. Thus, the coil 5a is de-energized, thereby opening the switch 5b to stop the operation of the system.

When the ignition switch IGS is closed for driving the vehicle, the coil 6a of the relay Ry2 is energized to open the switch 6b, thereby disconnecting the heating element 1a from the battery B.

From the foregoing, it will be understood that the present invention provides an anti-frost windshield by which the dew on the windshield is wiped away before forming the frost. Since the moisture on the windshield can be easily evaporated after the wiper wipes out the dew, the system can be operated by low voltage so that the power consumption can be reduced.

While the presently preferred embodiment of the present invention has been shown and described, it is to be understood that various changes and modifications may be made without departing from the scope of the invention as set forth in the appended claims.

What is claimed is:

1. A system for preventing frost from accumulating on a windshield of a motor vehicle having a battery and a wiper system including an intermittent wiper unit for intermittently operating a wiper of the vehicle, comprising
   a heating element provided on the windshield;
   a temperature switch producing a temperature signal when the temperature of the windshield is at about 0° C.;
   a humidity switch for producing a humidity signal when the humidity of air outside of the windshield becomes about 100%;
   a gate responsive to the temperature signal and the humidity signal for producing a frost signal;
   switch means provided between the heating element and the battery of the vehicle responsive to the frost signal for energizing the heating element; and
   operating means responsive to the frost signal for operating the intermittent wiper unit.

2. The system according to claim 1, wherein said gate is an AND gate.

3. The system according to claim 1, wherein the switch means comprises:
   a switch; and
   a transistor responsive to the frost signal for closing said switch.

4. The system according to claim 1, further comprising:
   a water switch for producing a water signal when detecting at least rain water; and
   gate means responsive to the water signal for applying an inoperative signal to the switch means to render the switch means inoperative, whereby the operation of the system is prevented.

5. The system according to claim 1, further comprising:
   an ambient temperature switch for producing an ambient temperature signal when ambient temperature becomes higher than a predetermined value, so as to actuate said gate in dependency on the ambient temperature signal.

* * * * *